(12) United States Patent
Kotake et al.

(10) Patent No.: US 10,204,445 B2
(45) Date of Patent: Feb. 12, 2019

(54) INFORMATION PROCESSING APPARATUS, METHOD, AND STORAGE MEDIUM FOR DETERMINING A FAILURE OF POSITION AND ORIENTATION MEASUREMENT OF AN IMAGE CAPTURING DEVICE

(71) Applicant: CANON KABUSHIKI KAISHA, Tokyo (JP)

(72) Inventors: Daisuke Kotake, Yokohama (JP); Keisuke Tateno, Munich (DE)

(73) Assignee: Canon Kabushiki Kaisha, Tokyo (JP)

( * ) Notice: Subject to any disclaimer, the term of this patent is extended or adjusted under 35 U.S.C. 154(b) by 197 days.

(21) Appl. No.: 15/229,010

(22) Filed: Aug. 4, 2016

(65) Prior Publication Data

US 2017/0039718 A1 Feb. 9, 2017

(30) Foreign Application Priority Data

Aug. 7, 2015 (JP) .................................. 2015-157603

(51) Int. Cl.
*G06K 9/00* (2006.01)
*G06T 17/00* (2006.01)
*G06T 7/73* (2017.01)

(52) U.S. Cl.
CPC ................ *G06T 17/00* (2013.01); *G06T 7/73* (2017.01); *G06T 2207/10028* (2013.01); *G06T 2207/30244* (2013.01)

(58) Field of Classification Search
CPC . G06T 2207/10028; G06T 2207/30244; G06T 7/0042; G06T 7/73; G06T 17/00
See application file for complete search history.

(56) References Cited

U.S. PATENT DOCUMENTS

| 2004/0017506 A1* | 1/2004 | Livingston | ............. | G03B 17/18 |
| | | | | 348/374 |
| 2005/0253871 A1* | 11/2005 | Anabuki | ................... | G01S 5/16 |
| | | | | 345/633 |

(Continued)

OTHER PUBLICATIONS

Klein et al ("Parallel Tracking and Mapping for Small AR Workspaces", pp. 1-10, IEEE 2007.*

(Continued)

*Primary Examiner* — Amara Abdi
(74) *Attorney, Agent, or Firm* — Canon U.S.A., Inc. IP Division

(57) ABSTRACT

An information processing apparatus includes: an input unit that inputs an image of real space captured by an image capturing apparatus; a measurement value input unit that inputs a measurement value regarding a position and orientation of the image capturing apparatus measured by a sensor attached to the image capturing apparatus; a position and orientation derivation unit that, based on three-dimensional information of a feature in the real space and the input image, derives a position and orientation of the image capturing apparatus; a determination unit that, based on the measurement value and the position and orientation of the image capturing apparatus derived by the position and orientation derivation unit, makes a determination as to whether derivation of the position and orientation of the image capturing apparatus performed by the position and orientation derivation unit has failed; and an output unit that outputs a result provided by the determination unit.

9 Claims, 5 Drawing Sheets

(56) References Cited

U.S. PATENT DOCUMENTS

2008/0112699 A1* 5/2008 Huseth ................ G01S 5/02
  396/89
2015/0070469 A1* 3/2015 Yoshibayashi .......... G06T 19/00
  348/46

OTHER PUBLICATIONS

Klein et al ("Parallel Tracking and Mapping for Small AR Workspaces", pp. 1-10, IEEE (Year: 2007).*
G. Klein, et al., "Parallel Tracking and Mapping for Small AR Workspaces," Proc. 6th IEEE and ACM International Symposium on Mixed and Augmented Reality, Mar. 2007.
Z. Zhang, "A Flexible New Technique for Camera Calibration," IEEE Trans on Pattern Analysis and Machine Intelligence, vol. 22 No. 11, 2000, pp. 1330-1334.
K. Satoh, et al., "A Head Tracking Method Using Bird's Eye View Camera and Gyroscope," Proc. 3rd IEEE and ACM International Symposium on Mixed and Augmented Reality, Mar. 2004.
G. Klein, et al., "Improving the Agility of Keyframe-based SLAM," Proc. 10th European Conference on Computer Vision, 2008.

* cited by examiner

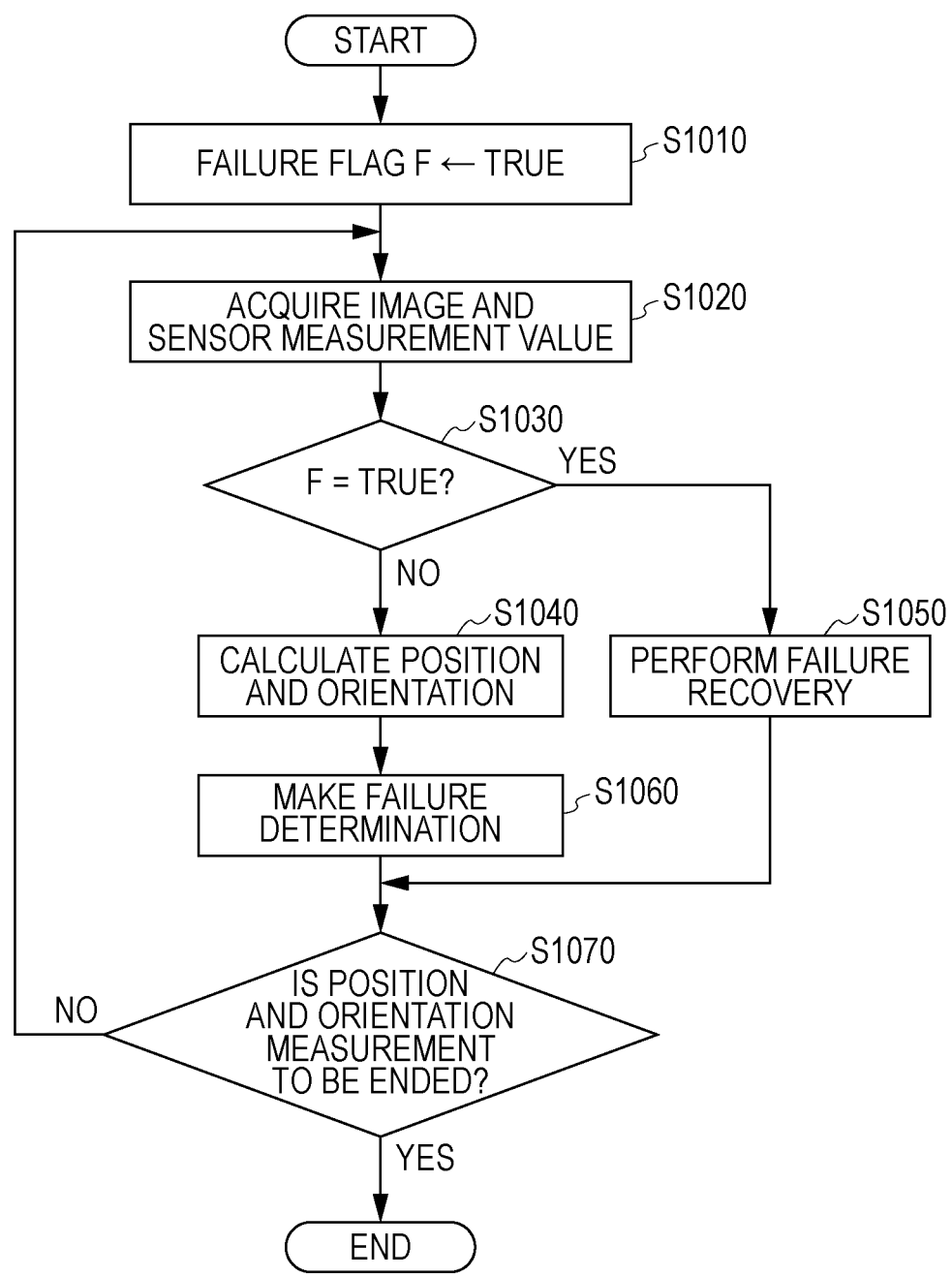

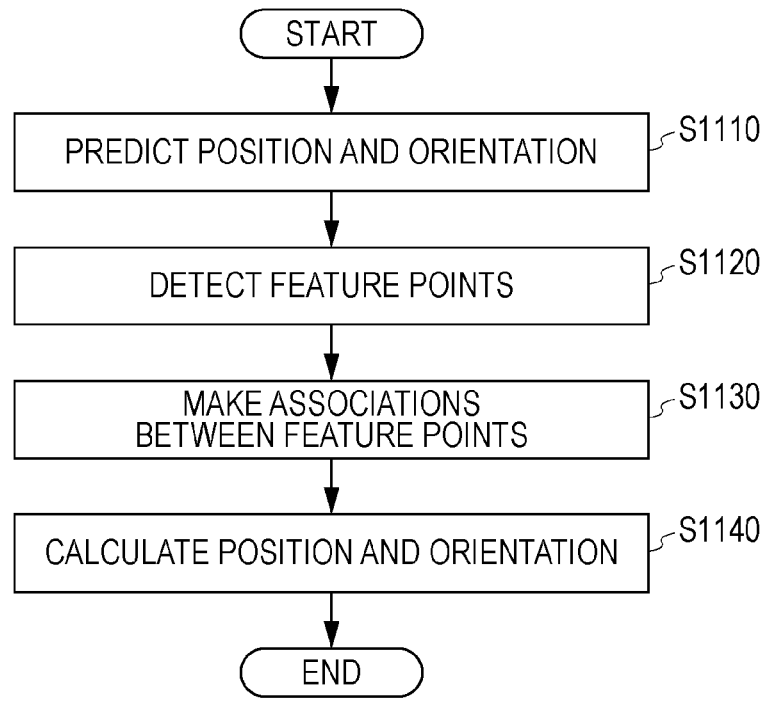
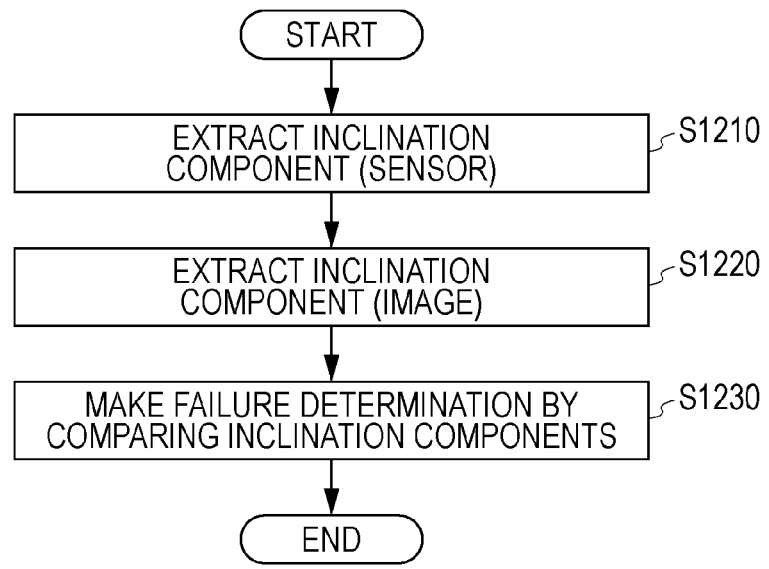

INFORMATION PROCESSING APPARATUS, METHOD, AND STORAGE MEDIUM FOR DETERMINING A FAILURE OF POSITION AND ORIENTATION MEASUREMENT OF AN IMAGE CAPTURING DEVICE

BACKGROUND OF THE INVENTION

Field of the Invention

The present invention relates to a method of measuring the position and orientation of an image capturing apparatus.

Description of the Related Art

Measurement of the position and orientation of an image capturing apparatus based on image information is used for alignment of a virtual object with real space in augmented reality/mixed reality, for self-location estimation of a robot or automobile, and for three-dimensional modeling of an object or scene.

A literature 1 (G. Klein and D. Murray, "Parallel Tracking and Mapping for Small AR Workspaces," Proc. 6th IEEE and ACM International Symposium on Mixed and Augmented Reality (ISMAR '07), 2007) discloses a method in which information of feature points in a scene is held as a three-dimensional map, and in which the position and orientation of an image capturing apparatus are estimated on the basis of associations between feature points detected on an image and feature points in the three-dimensional map. In this method, a position and orientation measured in a previous frame are used for measurement of a position and orientation in a current frame. For example, a position and orientation in a current frame are predicted on the basis of a position and orientation measured in a previous frame and a motion model and used for associating feature points on an image with feature points in the three-dimensional map. Furthermore, the predicted position and orientation are used as initial values for iterative calculation for obtaining a position and orientation in the current frame.

The case where the image capturing apparatus moves significantly between the current and previous frames, or the case where the number of feature points detected on an image is extremely small may result in failure of measurement of a position and orientation. This requires a process of detecting failure of measurement of a position and orientation and performing recovery from the failure. In the above-described literature 1, the quality of position and orientation measurement is determined on the basis of the proportion of correctly associated feature points. If low-quality measurement continues through a certain number of frames, it is determined that position and orientation measurement has failed.

Since the method of determining failure of position and orientation measurement in the above-described literature 1 is a method based on how a scene looks on an image, if portions similar in appearance exist in different locations within the scene, a wrong determination may be made as to whether an estimated position and orientation are correct. Furthermore, in the case where the number of feature points is extremely small, a wrong failure determination may be made because the proportion of correctly associated feature points is small even if an estimated position and orientation are correct.

SUMMARY OF THE INVENTION

To solve the above-described issues, for example, an information processing apparatus of the present specification includes: a three-dimensional information holding unit configured to hold three-dimensional information of a feature in real space; an image input unit configured to input an image of the real space captured by an image capturing apparatus; a measurement value input unit configured to input a measurement value regarding a position and orientation of the image capturing apparatus measured by a sensor attached to the image capturing apparatus; a position and orientation derivation unit configured to, based on the three-dimensional information and the input image, derive a position and orientation of the image capturing apparatus; a determination unit configured to, based on the measurement value and the position and orientation of the image capturing apparatus derived by the position and orientation derivation unit, make a determination as to whether derivation of the position and orientation of the image capturing apparatus performed by the position and orientation derivation unit has failed; and an output unit configured to output a result provided by the determination unit.

According to the present specification, a position and orientation can be derived robustly by determining whether a position and orientation estimation process has failed.

Further features of the present invention will become apparent from the following description of exemplary embodiments with reference to the attached drawings.

BRIEF DESCRIPTION OF THE DRAWINGS

FIG. 3 is a flowchart illustrating a procedure of a position and orientation measurement process in the first embodiment.

FIG. 4 is a flowchart illustrating a procedure of a process of step S1040 in the first embodiment.

FIG. 5 is a flowchart illustrating a procedure of a process of step S1060 in the first embodiment.

DESCRIPTION OF THE EMBODIMENTS

Before embodiments according to the present invention are described, a hardware configuration in which an information processing apparatus described in each embodiment is implemented will be described with reference to FIG. 8.

Figure 8:
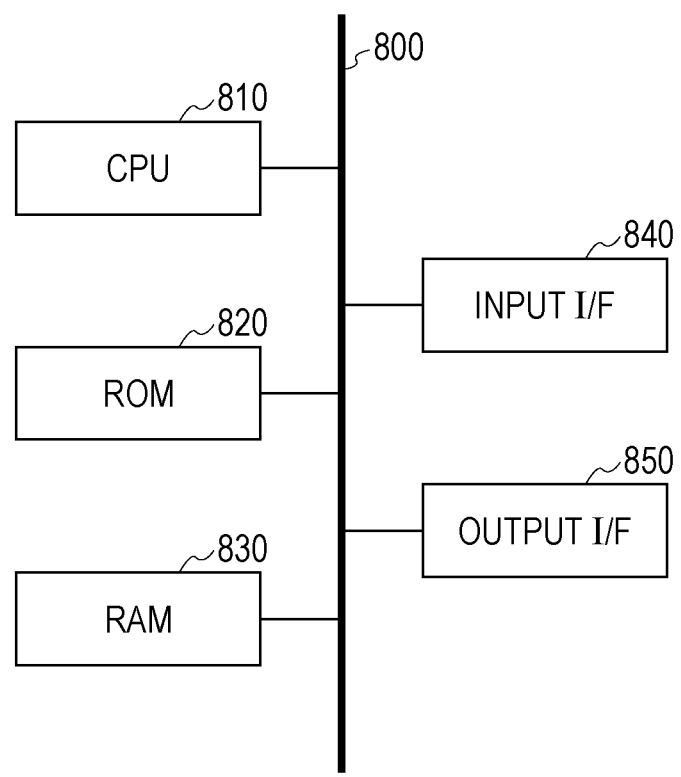
FIG. 8 illustrates an example of a hardware configuration of an information processing apparatus according to the present invention.

FIG. 8 illustrates a hardware configuration of an information processing apparatus in each embodiment. In FIG. 8, a central processing unit (CPU) 810 performs centralized control of devices connected thereto via a bus 800. The CPU 810 reads a processing step or program stored in a read only memory (ROM) 820 to execute it. Processing programs, device drivers, and so forth according to the embodiment, as well as an operating system (OS), are stored in the ROM 820 and temporarily stored in a random access memory (RAM) 830 to be executed as appropriate by the CPU 810. An input interface (I/F) 840 receives, from an external device (display device, operation device, or the like), an input in a form that the information processing apparatus can deal with, as an input signal. An output interface (I/F) 850 outputs, to an external device (display device), an output in a form that the display device can deal with, as an output signal.

First Embodiment

In a first embodiment, the case will be described where a method according to the present invention is applied to measurement of a camera position and orientation in real space. The camera position and orientation in the real space are required for rendering a virtual object in a mixed reality system that superimposes a virtual object on the real space and displays it. A camera in this embodiment is installed in a head-mounted display (HMD) that is used with it being worn on the head of a user which experiences the mixed reality system, or in a hand-held display (HHD) that is used with it being held by a hand of the user, for example. In this embodiment, a camera position and orientation are obtained by the following method, a virtual object is generated on the basis of the obtained position and orientation, and the generated virtual object is superimposed on real space, displayed, and thus presented to the user. In the case where the HMD or HHD is of a video see-through type, a composite image obtained by combining a generated virtual object with an image of the real space captured by the camera is displayed on the display and thus presented to the user. On the other hand, in the case where the HMD or HHD is of an optical see-through type, a virtual object is superimposed on the display through which the real space is directly seen and thus presented to the user.

Specifically, an orientation measured by an orientation sensor attached to the camera is compared with an orientation of the camera calculated by using an image captured by the camera, and it is thereby determined whether position and orientation measurement using the image has failed. If it is determined that the measurement has failed, a recovery process is performed, and thus measurement of a position and orientation is restarted. This avoids a wrong determination that the position and orientation measurement has been correctly performed because consistency has been achieved in the image despite the fact that the position and orientation measurement has been incorrectly performed and has failed. In this embodiment, a camera position and orientation refer to six parameters: three parameters of position coordinates (x, y, z) of a viewpoint position from which the camera captures an image in a world coordinate system, and three parameters representing the orientation of the camera, that is, representing X-axis, Y-axis, and Z-axis directions of a camera coordinate system in the world coordinate system. In this embodiment, assume that the three parameters representing the orientation are two parameters representing the direction of a rotation axis and one parameter representing the angle of rotation about the rotation axis in the world coordinate system. Note that the three parameters representing the orientation are not limited to these and may be represented by a roll angle, a pitch angle, and a yaw angle, or by Euler angles.

In this embodiment, a failure determination is made by using an inclination angle of the orientation of the camera in three-dimensional space. The inclination angle of the camera herein represents the inclination of the camera with respect to a gravity axis. A component other than the inclination angle of the orientation is an azimuth angle and represents a rotation about the gravity axis. In a typical orientation sensor, an acceleration sensor is included together with an angular velocity sensor (gyro sensor), the direction of the gravity axis can be used as an absolute reference of the inclination angle, and thus the inclination angle is used for a failure determination.

Figure 1:
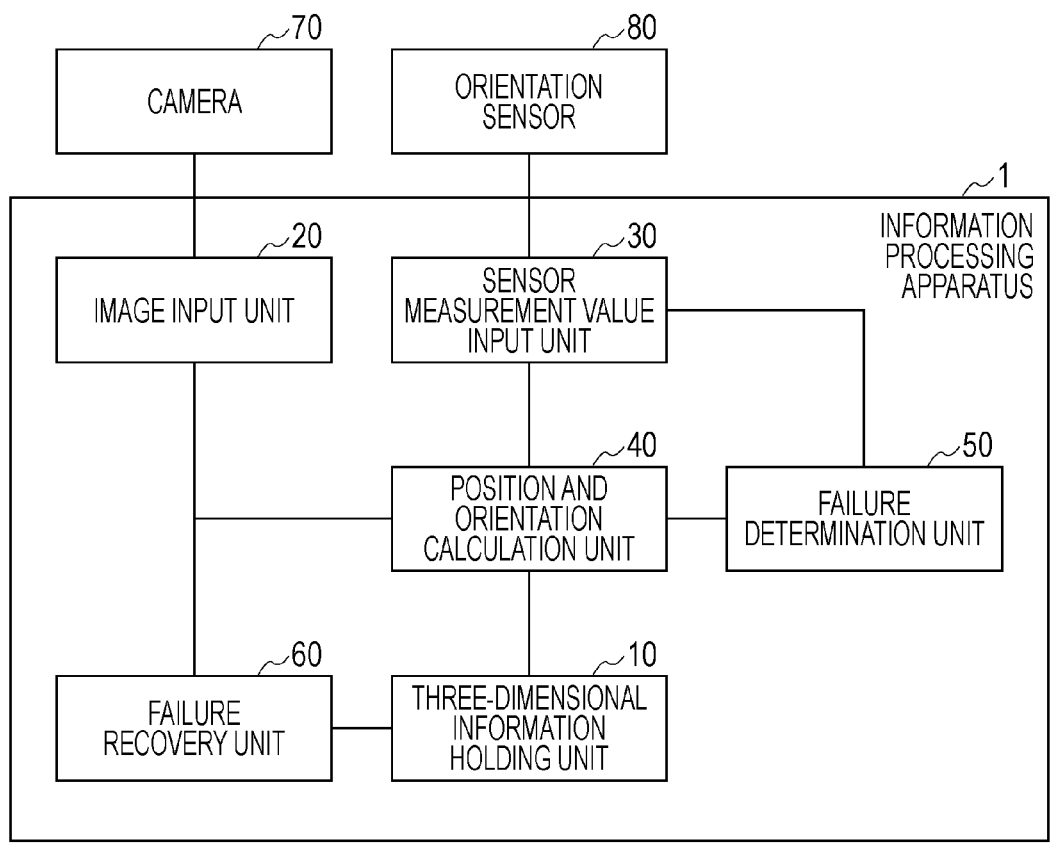
FIG. 1 illustrates the configuration of an information processing apparatus in a first embodiment.

FIG. 1 illustrates the configuration of an information processing apparatus 1 in this embodiment. The information processing apparatus 1 includes a three-dimensional information holding unit 10, an image input unit 20, a sensor measurement value input unit 30, a position and orientation calculation unit 40, and a failure determination unit 50. The image input unit 20 is connected to a camera 70. The sensor measurement value input unit 30 is connected to an orientation sensor 80. A failure recovery unit 60 is connected to the information processing apparatus 1.

The three-dimensional information holding unit 10 holds three-dimensional information of a scene (real space) used for estimating of a position and orientation based on an image. As disclosed in the literature 1, the three-dimensional information of the scene is held as map data. In the map data, a feature point database is held. In the feature point database, three-dimensional coordinates of a feature point in the world coordinate system specified in the scene, and an image patch representing the feature point are held. Furthermore, in the map data, a group of captured images of the scene to which a position and orientation where each image has been captured are appended as attributes is held. Hereinafter, images composing the group are each called a keyframe image. Map data may be generated in advance by a publicly known Structure from Motion technique, or may be generated in parallel with measurement of a position and orientation as in the literature 1. In this embodiment, in the world coordinate system, coordinate axes are set so that the Z axis is parallel to the gravity axis and the X and Y axes are orthogonal to the gravity axis (parallel to the ground).

The image input unit 20 inputs an image captured by the camera 70 to the position and orientation calculation unit 40. In this embodiment, the image input unit 20 inputs images from the camera 70 consecutively, and the information processing apparatus 1 measures a camera position and orientation where an image has been captured for each of the images sequentially captured by the camera 70. In this embodiment, since the user observes an image obtained by superimposing and rendering the computer graphic (CG) of a virtual object on an image captured by the camera 70, assume that an image to be input is a color image. In self-location estimation of, for example, an automobile or robot, since the user does not have to observe a captured image, an image to be input may be a grayscale image. Assume that intrinsic parameters (focal length, image center, and lens distortion parameter) of the camera 70 are already known. Camera intrinsic parameters are calibrated by a method proposed by Zhang (Z. Zhang, "A flexible new technique for camera calibration," IEEE Trans. on Pattern Analysis and Machine Intelligence, vol. 22, no. 11, pp. 1330-1334, 2000), for example.

Figure 2:
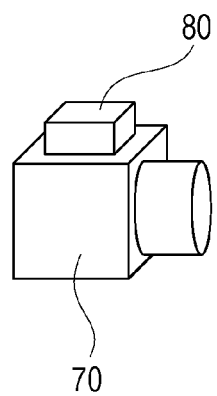
FIG. 2 illustrates an orientation sensor attached to a camera.

The sensor measurement value input unit 30 inputs an orientation with three degrees of freedom measured by the orientation sensor 80 to the position and orientation calculation unit 40 and the failure determination unit 50. As illustrated in FIG. 2, assume that the orientation sensor 80 is attached to the camera 70. Assume that the orientation of the orientation sensor 80 with respect to the camera 70 is already known, and that the orientation of the orientation sensor 80 in the world coordinate system can be converted into the orientation of the camera 70. The orientation of the orientation sensor 80 with respect to the camera 70 is calibrated by a method proposed by Satoh et al. (K. Satoh, S. Uchiyama, and H. Yamamoto, "A Head Tracking Method Using Bird's-Eye View Camera and Gyroscope," Proc. 3rd IEEE and ACM International Symposium on Mixed and Augmented Reality (ISMAR '04), 2004), for example.

The position and orientation calculation unit 40 calculates a camera position and orientation (derives a position and orientation) in the world coordinate system where an image has been captured, on the basis of the image input by the image input unit 20, an orientation measurement value input by the sensor measurement value input unit 30, and the map data held by the three-dimensional information holding unit 10.

The failure determination unit 50 determines, on the basis of the orientation measurement value input by the sensor measurement value input unit 30 and the camera orientation calculated by the position and orientation calculation unit 40, whether the calculation of the position and orientation performed by the position and orientation calculation unit 40 has failed, and the failure determination unit 50 outputs a result of the determination.

The failure recovery unit 60 performs failure recovery on the basis of the image input by the image input unit 20 and the map data held by the three-dimensional information holding unit 10 and thus restarts measurement of a position and orientation.

Next, a procedure of a position and orientation measurement process in this embodiment will be described. FIG. 3 is a flowchart illustrating a procedure of a position and orientation measurement process in this embodiment.

In step S1010, the position and orientation calculation unit 40 sets a failure flag F to TRUE. This is because a position and orientation are unknown when measurement of the position and orientation is started, and because the position and orientation calculation unit 40 is in the same state as that in which position and orientation measurement has failed.

In step S1020, the position and orientation calculation unit 40 acquires an image captured by the camera 70 and a camera orientation measured by the orientation sensor 80 via the image input unit 20 and the sensor measurement value input unit 30, respectively.

In step S1030, if the failure flag F is TRUE, the process proceeds to step S1050. If the failure flag F is FALSE, the process proceeds to step S1040.

In step S1040, the position and orientation calculation unit 40 calculates a camera position and orientation in the world coordinate system where the image has been captured, on the basis of the image captured by the camera 70, the camera orientation measured by the orientation sensor 80, and the map data held by the three-dimensional information holding unit 10. In step S1040, position and orientation measurement in a previous frame has not failed, and thus the position and orientation are calculated by using a position and orientation measured in the previous frame. A detailed method of calculating a position and orientation will be described later.

In step S1050, position and orientation measurement in the previous frame has failed, and thus the failure recovery unit 60 performs a failure recovery process for the position and orientation measurement. Failure recovery of position and orientation measurement is performed by using a method proposed by Klein et al. (G. Klein and D. Murray, "Improving the Agility of Keyframe-based SLAM," Proc. 10th European Conference on Computer Vision, 2008). That is, matching between an image obtained by reducing the size of an input image and images obtained by reducing the sizes of keyframe images in the map data is performed, and a position and orientation appended as attributes to a keyframe image in which an error is smallest are regarded as a camera position and orientation where the input image has been captured.

In step S1060, the failure determination unit 50 determines, by comparing the camera orientation calculated by the position and orientation calculation unit 40 with the camera orientation measured by the orientation sensor 80, whether the position and orientation calculation performed by the position and orientation calculation unit 40 has failed. In this embodiment, a failure determination is made by comparing inclination components of camera orientations that can be measured by the orientation sensor 80 with high accuracy. Details of a failure determination process will be described later.

In step S1070, it is determined whether the position and orientation measurement is to be ended. If a command to end the position and orientation measurement is input from the user via a mouse, keyboard, or the like, the position and orientation measurement is ended. If no command is input, the process returns to step S1020 to continue the position and orientation measurement.

(Details of Process of Step S1040)

Next, a position and orientation calculation process of step S1040 will be described in detail. FIG. 4 is a flowchart illustrating a procedure of the process of step S1040.

In step S1110, the position and orientation calculation unit 40 predicts a position and orientation in a current frame from the measurement value provided by the orientation sensor 80 and the position and orientation calculated in the previous frame. As a predicted position, the position measured in the previous frame is directly used. Assume that a rotation matrix with three degrees of freedom representing the orientation calculated in the previous frame is R(t−1), and that rotation matrixes with three degrees of freedom representing the orientations measured by the orientation sensor 80 in the previous frame and the current frame are respectively $R_s(t-1)$ and $R_s(t)$. R(t−1), $R_s(t-1)$, and $R_s(t)$ each represent a world coordinate system-based camera orientation. A 3×3 rotation matrix R(t) representing a predicted orientation in the current frame is calculated as in Equation 1.

$$R(t)=R(t-1)\cdot(R_s(t-1))^{-1}\cdot R_s(t) \qquad \text{(Equation 1)}$$

In step S1120, the position and orientation calculation unit 40 detects feature points from the input image. Detection of a feature point is performed by the same method as that disclosed in the literature 1, and coordinates (u, v) on the input image of the detected feature point are held for use in a subsequent step.

In step S1130, the position and orientation calculation unit 40 associates the feature points detected in step S1120 with feature points in the map data. Specifically, first, world coordinates of each feature point in the map data are converted into coordinates on the input image by using the predicted position and the predicted orientation in the current frame obtained in step S1110. Subsequently, the degrees of similarity between image patches of the feature points detected in step S1120 existing within a certain region around the converted coordinates and image patches of the feature points in the map data are calculated. Assuming that a feature point and a feature point in the map data between which the degree of patch similarity is highest correspond to each other, a set of world coordinates of the feature point in the map data and coordinates of the feature point detected on the input image is used in a subsequent step as association data.

In step S1140, the position and orientation calculation unit 40 calculates, by using association data obtained in step S1130, the camera position and orientation where the current frame has been captured. Calculation of a camera position and orientation is performed by the same method as that disclosed in the literature 1. That is, in order that a calculated position and orientation result in a reduction in error (reprojection error) between coordinates obtained by converting world coordinates of a feature point in the map data into image coordinates and image coordinates of a feature point that has been detected on the input image and associated with the feature point, a position and orientation are iteratively calculated. Assume that a 3×3 rotation matrix representing the calculated camera orientation is $R_v(t)$. $R_v(t)$ is used in step S1060 to be described.

(Details of Process of Step S1060)

Next, a failure determination process of step S1060 will be described in detail. FIG. 5 is a flowchart illustrating a procedure of the process of step S1060.

In step S1210, the failure determination unit 50 extracts an inclination component from the orientation $R_s(t)$ measured by the orientation sensor 80 in the current frame. $R_s(t)$ can be factored into an inclination component $R_{is}$ and an azimuth component $R_{as}$ as indicated in Equation 2.

$$R_s(t) = R_{as} \cdot R_{is} \quad \text{(Equation 2)}$$

As described above, since the direction of the Z axis in the world coordinate system is the direction of the gravity axis, $R_{as}$ is represented by a rotation Rz about the Z axis in the world coordinate system. Since $R_{is}$ refers to a rotation about a vector on a plane (the ground) orthogonal to the gravity axis, $R_{is}$ is represented by a rotation RyRx obtained by combining a rotation Rx about the X axis with a rotation Ry about the Y axis in the world coordinate system. Assuming that rotation angles of Rz, Ry, and Rx are respectively $\alpha$, $\beta$, and $\gamma$, $R_s(t)$ can be represented by Equation 3.

$$R_s(t) = \begin{bmatrix} \cos\alpha & -\sin\alpha & 0 \\ \sin\alpha & \cos\alpha & 0 \\ 0 & 0 & 1 \end{bmatrix} \begin{bmatrix} \cos\beta & 0 & \sin\beta \\ 0 & 1 & 0 \\ -\sin\beta & 0 & \cos\beta \end{bmatrix} \begin{bmatrix} 1 & 0 & 0 \\ 0 & \cos\gamma & -\sin\gamma \\ 0 & \sin\gamma & \cos\gamma \end{bmatrix} \quad \text{(Equation 3)}$$

Equation 3 expands into Equation 4.

$$R_s(t) = \begin{bmatrix} \cos\alpha\cos\beta & \cos\alpha\sin\beta\sin\gamma - \cos\gamma\sin\alpha & \cos\alpha\sin\beta\cos\gamma + \sin\gamma\sin\alpha \\ \sin\alpha\cos\beta & \sin\alpha\sin\beta\sin\gamma + \cos\gamma\cos\alpha & \sin\alpha\sin\beta\cos\gamma - \sin\gamma\cos\alpha \\ -\sin\beta & \sin\gamma\cos\beta & \cos\gamma\cos\beta \end{bmatrix} \quad \text{(Equation 4)}$$

The inclination component $R_{is}$ is extracted from $R_s(t)$ by calculating $\cos\beta$, $\sin\beta$, $\cos\gamma$, and $\sin\gamma$ on the basis of a value of each element of $R_s(t)$ obtained from the sensor measurement value and Equation 4.

In step S1220, the failure determination unit 50 extracts an inclination component $R_{iv}$ by factoring the camera orientation $R_v(t)$ calculated in step S1040 into an azimuth component $R_{av}$ and the inclination component $R_{iv}$ by using the same method as that in step S1210.

In step S1230, the failure determination unit 50 determines, by comparing the inclination components $R_{is}$ and $R_{iv}$ extracted in step S1210 and step S1220, whether the calculation of the position and orientation has failed in step S1040. Specifically, vectors $g_s$ and $g_v$ representing a camera-based gravity-axis direction are calculated from the respective inclination components $R_{is}$ and $R_{iv}$, and, if an angular difference between two vectors is not less than a threshold value, it is determined that the calculation of the position and orientation has failed. As described above, in this embodiment, the Z axis in the world coordinate system is parallel to the gravity-axis direction. Thus, as indicated in Equations 5, vectors representing the Z axis in the world coordinate system are converted into the vectors $g_s$ and $g_v$ representing the gravity-axis direction in the camera coordinate system by using the inclination components $R_{is}$ and $R_{iv}$.

$$g_s = (R_{is})^{-1} \begin{bmatrix} 0 \\ 0 \\ 1 \end{bmatrix}, \quad g_v = (R_{iv})^{-1} \begin{bmatrix} 0 \\ 0 \\ 1 \end{bmatrix} \quad \text{(Equation 5)}$$

If an angle formed by the calculated two vectors $g_s$ and $g_v$ is not less than the threshold value, the failure flag F is set to TRUE. If the angle is less than the threshold value, the failure flag F is set to FALSE.

As described above, in the first embodiment, failure of position and orientation measurement is determined by comparing an inclination angle measured by an orientation sensor with an inclination angle calculated based on an image, recovery from failure of position and orientation measurement is thereby performed at an appropriate point in time, and thus position and orientation measurement can be restarted.

Note that information used for determining failure of position and orientation measurement is not limited to an inclination component of an orientation and may be any information that can be directly compared with a value measured by a sensor. For example, if the orientation sensor can also measure an azimuth angle accurately outdoors or the like, an orientation with three degrees of freedom may be an object to be compared. An azimuth angle of the orientation may be an object to be compared. Furthermore, a sensor used is not limited to the orientation sensor and may be any sensor that measures a position or orientation. For example, the sensor may be an inclination sensor that directly measures an inclination angle. A position sensor, such as a global positioning system (GPS), may be used, and thus a position may be an object to be compared. A sensor, such as an atmospheric pressure sensor, that measures the height may be used, and thus a height component of a position may be an object to be compared. Furthermore, an atmospheric pressure measured by the atmospheric pressure sensor may be an object to be compared without the atmospheric pressure being converted to the height. Additionally, a sensor, such as a magnetic sensor or motion capture system, that measures a position and orientation may be used.

When a determination of failure of position and orientation measurement is made, there may be used a combination of a failure determination described in this embodiment and a failure determination disclosed in the literature 1. The failure determination described in this embodiment is made by comparing a sensor measurement value with a measurement value based on an image. The failure determination disclosed in the literature 1 is made on the basis of only image information. That is, the failure determination based on only image information is made, and, if it is determined that no failure has occurred, the failure determination described in this embodiment may be made.

Note that a camera that captures an image to be used for measuring a position and orientation does not have to be one camera, and two or more cameras (for example, a stereo camera) may be used. Not a camera that captures a typical grayscale image or color image but a camera that captures a range image may be used.

A position and orientation calculation unit may be any unit that calculates a position and orientation on the basis of an image and map data. In the case of a stereo camera, a position and orientation may be calculated by using images captured by the stereo camera. In the case where a camera that captures a range image is used, a position and orientation may be calculated by using a range image. A feature used for calculating a position and orientation is not limited to a feature point and may be any other feature that can be detected from an image and registered as map data. For example, a feature may be an edge which is a point where an intensity gradient is large in a grayscale image.

A failure recovery process performed by a failure recovery unit is not limited to a method in which image matching is performed and may be any method in which a position and orientation are calculated from an image input without prior information of the position and orientation. For example, as disclosed in the literature 1, associations between feature points in map data and feature points on an image may be obtained by a classifier, and a position and orientation may be calculated from the obtained associations.

Three-dimensional information of a scene held by a three-dimensional information holding unit is not limited to a database of three-dimensional coordinates of feature points in the world coordinate system and may be provided in any expression form that enables conversion into three-dimensional coordinates in the world coordinate system. For example, a group of captured images of a scene to which a position and orientation in the world coordinate system where each image has been captured are appended as attributes is held, and coordinates of feature points of the group of captured images are held as three-dimensional coordinates in the camera coordinate system and thus may be converted into three-dimensional coordinates in the world coordinate system by using the position and orientation contained in the attributes.

Second Embodiment

In the first embodiment, a determination of failure of position and orientation measurement is made by directly comparing a position and orientation measured by the sensor with a position and orientation calculated based on an image. In a second embodiment, a determination of failure of position and orientation measurement is made by comparing a difference between measurement values obtained from the sensor with differences between positions and orientations calculated based on images.

Specifically, failure of position and orientation measurement using an image is determined by comparing a difference between orientations measured by the orientation sensor in different frames with a difference between orientations calculated by using images captured by the camera. Thus, for example, even if a specific component, such as an inclination angle or azimuth angle of the sensor, cannot be measured with high accuracy, failure of position and orientation measurement can be determined.

The configuration of an information processing apparatus in this embodiment is the same as that of the information processing apparatus 1 described in the first embodiment, and thus the description thereof is omitted. A procedure of a position and orientation measurement process in the second embodiment is also the same as that in the first embodiment, and thus the description thereof is omitted. A difference between the first embodiment and the second embodiment is step S1060 in the flowchart of FIG. 3.

Figure 6:
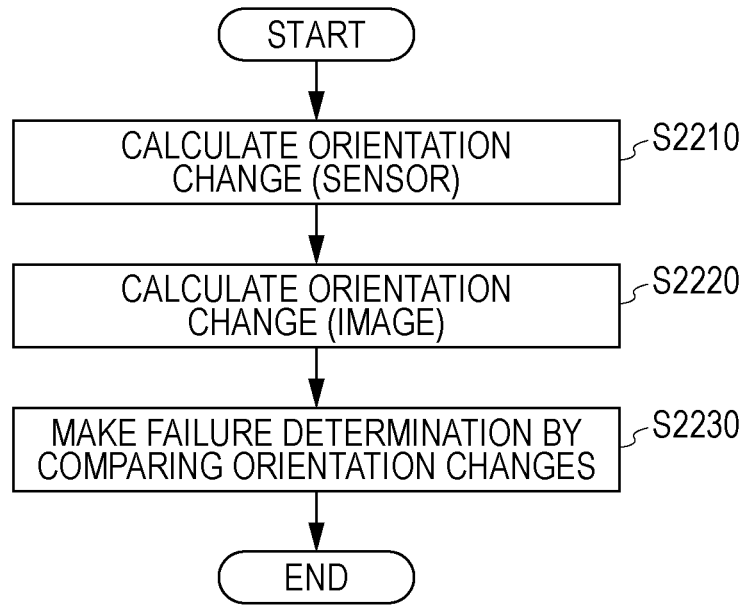
FIG. 6 is a flowchart illustrating a procedure of a process of step S1060 in a second embodiment.

FIG. 6 is a flowchart illustrating a procedure of a process of step S1060 in this embodiment.

In step S2210, the failure determination unit 50 calculates an orientation change $\Delta R_s$ between frames from the orientation $R_s(t-1)$ measured by the orientation sensor 80 in the previous frame and the orientation $R_s(t)$ measured by the orientation sensor 80 in the current frame. $\Delta R_s$ is calculated as in Equation 6.

$$\Delta R_s = (R_s(t-1))^{-1} \cdot R_s(t) \quad \text{(Equation 6)}$$

In step S2220, the failure determination unit 50 calculates an orientation change $\Delta R_v$ between the frames from a camera orientation $R_v(t-1)$ calculated by using the previous frame and the camera orientation $R_v(t)$ calculated by using the current frame in step S1040. As in $\Delta R_s$, $\Delta R_v$ is calculated.

In step S2230, the failure determination unit 50 determines, by comparing the orientation changes $\Delta R_s$ and $\Delta R_v$ calculated in step S2210 and step S2220, whether the calculation of the position and orientation has failed in step S1040. Specifically, first, $\Delta R_{sv}$ that is a difference between the orientation changes $\Delta R_s$ and $\Delta R_v$ is calculated by Equation 7. $\Delta R_{sv}$ is a 3×3 rotation matrix. If a rotation angle of $\Delta R_{sv}$ is not less than a certain threshold value, it is determined that the calculation has failed.

$$\Delta R_{sv} = (\Delta R_s)^{-1} \Delta R_v \quad \text{(Equation 7)}$$

A rotation angle $\theta$ of $\Delta R_{sv}$ is obtained by using the fact that the trace of the 3×3 rotation matrix $\Delta R_{sv}$ is $1+2\cos\theta$. If the rotation angle $\theta$ is not less than the threshold value, the failure flag F is set to TRUE. If the rotation angle $\theta$ is less than the threshold value, the failure flag F is set to FALSE.

As described above, in this embodiment, for example, even if a specific component, such as an inclination angle or azimuth angle of the sensor, cannot be measured with high accuracy, failure of position and orientation measurement can be determined by comparing a difference between orientation measurement values obtained from the sensor with a difference between orientations calculated based on images.

In this embodiment, a difference between orientations is calculated from a current frame and a previous frame. However, a difference between orientations does not have to be calculated from temporally adjacent frames. For example, a difference may be calculated from an orientation in a frame several frames before and an orientation in a current frame.

Note that information used for determining failure of position and orientation measurement is not limited to a difference between orientation measurement values and may be any information from which differences can be compared. For example, a position sensor, such as a GPS, may be used, and thus a difference between positions may be an object to be compared. A sensor, such as an atmospheric pressure sensor, that measures the height may be used, and thus a difference between the heights may be an object to be compared. Furthermore, a difference between atmospheric pressures measured by the atmospheric pressure sensor may be an object to be compared without the atmospheric pressures being converted to the heights.

When a determination of failure of position and orientation measurement is made, there may be used a combination of a failure determination described in this embodiment and a failure determination disclosed in the literature 1. The failure determination described in this embodiment is made by comparing a difference between sensor measurement values with a difference between measurement values based on images. The failure determination disclosed in the literature 1 is made on the basis of only image information. That is, the failure determination based on only image information is made, and, if it is determined that no failure has occurred, the failure determination described in this embodiment may be made.

Furthermore, a sensor used is not limited to a sensor that measures a position or orientation and may be a sensor, such as a velocity sensor, acceleration sensor, or angular velocity sensor, that measures a change in position or orientation. In the case where such a sensor is used, a difference between sensor measurement values does not have to be obtained, and a physical quantity (velocity, acceleration, or angular velocity) corresponding to a sensor measurement value may be calculated from differences between positions and orientations calculated based on images.

Third Embodiment

In the first embodiment and the second embodiment, a sensor measurement value is used for determining failure of position and orientation measurement. On the other hand, in a third embodiment, a sensor measurement value is used for failure recovery of position and orientation measurement. Use of a sensor measurement value for failure recovery enables fast failure recovery.

The configuration of an information processing apparatus in the third embodiment is the same as that of the information processing apparatus 1 described in the first embodiment, and thus the description thereof is omitted. A procedure of a position and orientation measurement process in the third embodiment is also the same as that in the first embodiment, and thus the description thereof is omitted. A difference between the first embodiment and the third embodiment is step S1050 in the flowchart of FIG. 3.

Figure 7:
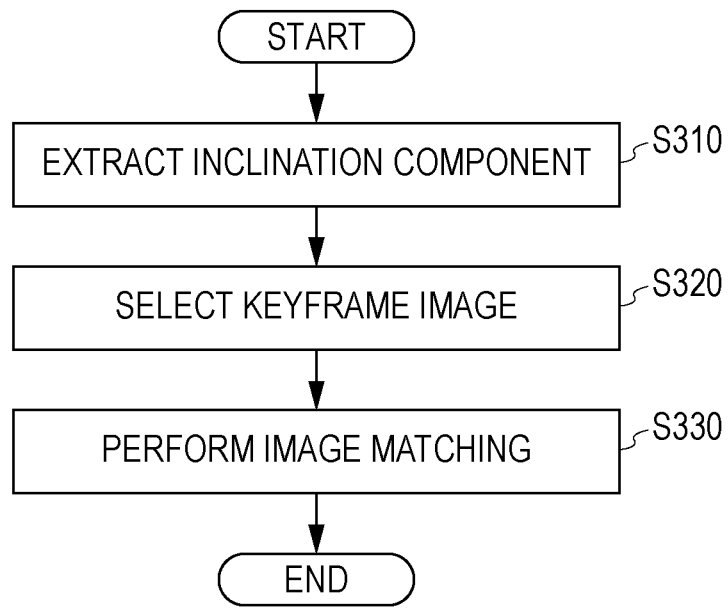
FIG. 7 is a flowchart illustrating a procedure of a process of step S1050 in a third embodiment.

FIG. 7 is a flowchart illustrating a procedure of a process of step S1050 in the third embodiment.

In step S310, the failure recovery unit 60 extracts an inclination component $R_{is}$ from an orientation measurement value measured by the orientation sensor 80 by using the method described in the first embodiment.

In step S320, the failure recovery unit 60 extracts, for each keyframe image held in the map data, an inclination component $R_{ik}$ from an orientation appended as an attribute to the keyframe image and obtains a difference between $R_{is}$ and $R_{ik}$ as an angular difference between vectors in the camera-based gravity-axis direction described in the first embodiment. Then, a keyframe image in which an angular difference is within a certain threshold value is selected as an object to be subjected to image matching in failure recovery.

In step S330, as described in step S1050 in the first embodiment, the failure recovery unit 60 performs matching between an image obtained by reducing the size of the input image and an image obtained by reducing the size of a keyframe image in the map data. On this occasion, matching with all keyframe images is not performed, but matching with only a keyframe image selected in step S320 is performed. Then, a position and orientation appended as attributes to a keyframe image in which a matching error is smallest are regarded as a camera position and orientation where the input image has been captured.

As described above, in this embodiment, keyframe images to be subjected to image matching in failure recovery are limited by using a measurement value provided by the orientation sensor, thus enabling fast failure recovery.

A sensor measurement value used for limiting keyframe images is not limited to an inclination angle and may be anything that can be compared with a position and orientation appended as attributes to each keyframe image. For example, keyframe images may be limited by using an orientation with three degrees of freedom or by using only an azimuth component of an orientation. Furthermore, a sensor used is not limited to the orientation sensor and may be a position sensor, such as a GPS, or may be a height sensor, such as an atmospheric pressure sensor.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Summary of Effects

According to the present invention, failure of position and orientation measurement is determined by comparing an inclination angle measured by an orientation sensor with an inclination angle calculated based on an image, recovery from failure of position and orientation measurement is thereby performed at an appropriate point in time, and thus position and orientation measurement can be restarted.

Furthermore, for example, even if a specific component, such as an inclination angle or azimuth angle of the sensor, cannot be measured with high accuracy, failure of position and orientation measurement can be determined by comparing a difference between orientation measurement values obtained from the sensor with a difference between orientations calculated based on images.

Furthermore, use of a measurement value provided by the orientation sensor for failure recovery enables fast failure recovery.

Summary of Definitions

A three-dimensional information holding unit constituting an information processing apparatus in the present invention holds three-dimensional information of a scene used for estimating a position and orientation based on an image. As three-dimensional information of a scene, a feature point database holding three-dimensional coordinates of a feature point in a world coordinate system specified in the scene may be held. Furthermore, a group of captured images of the scene to which a position and orientation in the world coordinate system where each image has been captured are appended as attributes is held, and three-dimensional coordinates of feature points of the group of captured images in a camera coordinate system are held and thus may be converted into three-dimensional coordinates in the world coordinate system by using the position and orientation contained in the attributes.

An image input unit inputs an image captured by a camera. The camera may be a camera that captures a grayscale image, or may be a camera that captures a color image. Furthermore, a camera that captures a range image may be used.

A sensor measurement value input unit inputs a measurement value provided by a sensor that measures information regarding a position or orientation. The sensor may be a sensor, such as an orientation sensor, position sensor, inclination sensor, or height sensor, that directly measures a position and orientation, or may be a sensor, such as a velocity sensor, acceleration sensor, or angular velocity sensor, that measures changes in position and orientation.

A position and orientation calculation unit may be any unit that calculates, on the basis of an image and three-dimensional information of a scene, a camera position and orientation where the image has been captured. As for an image used for calculating a position and orientation, an image captured by a single-lens camera may be used, or images captured by a camera with two or more lenses, such as a stereo camera, may be used. Furthermore, there may be used a range image captured not by a camera that captures a grayscale/color image but by a camera that captures a range image. A feature used for calculating a position and orientation is not limited to a feature point and may be any other feature that can be detected from an image and registered as map data. For example, a feature may be an edge which is a point where an intensity gradient is large in a grayscale image.

The position and orientation calculation unit calculates a position and orientation so that a re-projection error of a feature point detected on an image is reduced.

A failure determination unit makes a determination of failure of position and orientation calculation using an image by using a sensor measurement value. A position or orientation measured by the sensor may be directly compared with a position and orientation calculated by using an image, or the amounts of change in position or orientation may be compared.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-157603, filed Aug. 7, 2015, which is hereby incorporated by reference herein in its entirety.

What is claimed is:

1. An information processing apparatus comprising:
   one or more processors; and
   one or more memories storing instructions, when executed by the one or more processors, causing the information processing apparatus to function as:
   a three-dimensional information holding unit configured to hold three-dimensional information of a feature in real space;
   an image input unit configured to input an image of the real space captured by an image capturing apparatus;
   a measurement value input unit configured to input a measurement value regarding a position and orientation of the image capturing apparatus measured by a sensor attached to the image capturing apparatus;
   a position and orientation derivation unit configured to, based on the three-dimensional information and the input image, derive a position and orientation of the image capturing apparatus;
   a determination unit configured to, based on the measurement value and the position and orientation of the image capturing apparatus derived by the position and orientation derivation unit, make a determination as to whether derivation of the position and orientation of the image capturing apparatus performed by the position and orientation derivation unit has failed;
   a recovery unit configured to, if the determination unit determines that the derivation of the position and orientation performed by the position and orientation derivation unit has failed, perform recovery from failure of the derivation of the position and orientation of the image capturing apparatus performed by the position and orientation derivation unit; and
   an output unit configured to output a result provided by the determination unit,
   wherein the measurement value is a parameter representing an orientation of the image capturing apparatus, and
   wherein the determination unit determines failure of the derivation of the position and orientation by comparing an amount of change in parameter representing an orientation measured by the sensor with a difference between orientations of the image capturing apparatus derived by the position and orientation derivation unit.

2. The information processing apparatus according to claim 1, wherein the measurement value regarding the position and orientation of the image capturing apparatus is at least one parameter among a plurality of parameters representing the position and orientation of the image capturing apparatus.

3. The information processing apparatus according to claim 1,
   wherein the three-dimensional information holding unit further holds a plurality of images of the real space and parameters in association with each other, the parameters representing positions and orientations of the image capturing apparatus where the plurality of images have been captured, and
   wherein the recovery unit performs the recovery by using an image selected from among the plurality of images based on the measurement value and the parameters representing the positions and orientations held by the three-dimensional information holding unit.

4. An information processing apparatus comprising:
   one or more processors; and
   one or more memories storing instructions, when executed by the one or more processors, causing the information processing apparatus to function as:
   a three-dimensional information holding unit configured to hold three-dimensional information of a feature in real space;
   an image input unit configured to input an image of the real space captured by an image capturing apparatus;
   a measurement value input unit configured to input a measurement value regarding a position and orientation of the image capturing apparatus measured by a sensor attached to the image capturing apparatus;
   a position and orientation derivation unit configured to, based on the three-dimensional information and the input image, derive a position and orientation of the image capturing apparatus;
   a determination unit configured to, based on the measurement value and the position and orientation of the image capturing apparatus derived by the position and orientation derivation unit, make a determination as to whether derivation of the position and orientation of the image capturing apparatus performed by the position and orientation derivation unit has failed;

a recovery unit configured to, if the determination unit determines that the derivation of the position and orientation performed by the position and orientation derivation unit has failed, perform recovery from failure of the derivation of the position and orientation of the image capturing apparatus performed by the position and orientation derivation unit; and an output unit configured to output a result provided by the determination unit, wherein the measurement value is a parameter representing a position of the image capturing apparatus, and wherein the determination unit determines failure of the derivation of the position and orientation by comparing an amount of change in parameter representing a position measured by the sensor with a difference between positions of the image capturing apparatus derived by the position and orientation derivation unit.

5. The information processing apparatus according to claim 1,
wherein the image capturing apparatus is used being worn on or held by part of a body of a user.

6. An information processing method comprising:
an image input step of inputting an image of real space captured by an image capturing apparatus;
a measurement value input step of inputting a measurement value regarding a position and orientation of the image capturing apparatus measured by a sensor attached to the image capturing apparatus;
a position and orientation derivation step of, based on three-dimensional information of a feature contained in the real space and the input image, deriving a position and orientation of the image capturing apparatus;
a determination step of, based on the measurement value and the position and orientation of the image capturing apparatus derived in the position and orientation derivation step, making a determination as to whether derivation of the position and orientation of the image capturing apparatus performed in the position and orientation derivation step has failed; and
a recovery step of, if the determination step determines that the derivation of the position and orientation performed by the position and orientation derivation step has failed, perform recovery from failure of the derivation of the position and orientation of the image capturing apparatus performed by the position and orientation derivation step; and
an output step of outputting a result provided in the determination step,
wherein the measurement value is a parameter representing an orientation of the image capturing apparatus, and
wherein the determination step determines failure of the derivation of the position and orientation by comparing an amount of change in parameter representing an orientation measured by the sensor with a difference between orientations of the image capturing apparatus derived by the position and orientation derivation step.

7. A non-transitory computer-readable storage storing a program that causes a computer to function as units of an information processing apparatus, the information processing apparatus comprising:

one or more processors; and
one or more memories storing instructions, when executed by the one or more processors, causing the information processing apparatus to function as:
a three-dimensional information holding unit configured to hold three-dimensional information of a feature in real space;
an image input unit configured to input an image of the real space captured by an image capturing apparatus;
a measurement value input unit configured to input a measurement value regarding a position and orientation of the image capturing apparatus measured by a sensor attached to the image capturing apparatus;
a position and orientation derivation unit configured to, based on the three-dimensional information and the input image, derive a position and orientation of the image capturing apparatus;
a determination unit configured to, based on the measurement value and the position and orientation of the image capturing apparatus derived by the position and orientation derivation unit, make a determination as to whether derivation of the position and orientation of the image capturing apparatus performed by the position and orientation derivation unit has failed;
a recovery unit configured to, if the determination unit determines that the derivation of the position and orientation performed by the position and orientation derivation unit has failed, perform recovery from failure of the derivation of the position and orientation of the image capturing apparatus performed by the position and orientation derivation unit; and
an output unit configured to output a result provided by the determination unit,
wherein the measurement value is a parameter representing an orientation of the image capturing apparatus, and
wherein the determination unit determines failure of the derivation of the position and orientation by comparing an amount of change in parameter representing an orientation measured by the sensor with a difference between orientations of the image capturing apparatus derived by the position and orientation derivation unit.

8. An information processing method comprising:
an image input step of inputting an image of real space captured by an image capturing apparatus;
a measurement value input step of inputting a measurement value regarding a position and orientation of the image capturing apparatus measured by a sensor attached to the image capturing apparatus;
a position and orientation derivation step of, based on three-dimensional information of a feature contained in the real space and the input image, deriving a position and orientation of the image capturing apparatus;
a determination step of, based on the measurement value and the position and orientation of the image capturing apparatus derived in the position and orientation derivation step, making a determination as to whether derivation of the position and orientation of the image capturing apparatus performed in the position and orientation derivation step has failed; and
a recovery step of, if the determination step determines that the derivation of the position and orientation performed by the position and orientation derivation step has failed, perform recovery from failure of the derivation of the position and orientation of the image capturing apparatus performed by the position and orientation derivation step; and
an output step of outputting a result provided in the determination step, wherein the measurement value is a parameter representing a position of the image capturing apparatus, and wherein the determination step determines failure of the derivation of the position and orientation by comparing an amount of change in parameter representing a position measured by the sensor with a difference between positions of the image capturing apparatus derived by the position and orientation derivation step.

9. A non-transitory computer-readable storage medium storing a program that causes a computer to function as units of an information processing apparatus, the information processing apparatus comprising:

one or more processors; and one or more memories storing instructions, when executed by the one or more processors, causing the information processing apparatus to function as:

a three-dimensional information holding unit configured to hold three-dimensional information of a feature in real space;

an image input unit configured to input an image of the real space captured by an image capturing apparatus;

a measurement value input unit configured to input a measurement value regarding a position and orientation of the image capturing apparatus measured by a sensor attached to the image capturing apparatus;

a position and orientation derivation unit configured to, based on the three-dimensional information and the input image, derive a position and orientation of the image capturing apparatus;

a determination unit configured to, based on the measurement value and the position and orientation of the image capturing apparatus derived by the position and orientation derivation unit, make a determination as to whether derivation of the position and orientation of the image capturing apparatus performed by the position and orientation derivation unit has failed;

a recovery unit configured to, if the determination unit determines that the derivation of the position and orientation performed by the position and orientation derivation unit has failed, perform recovery from failure of the derivation of the position and orientation of the image capturing apparatus performed by the position and orientation derivation unit; and an output unit configured to output a result provided by the determination unit, wherein the measurement value is a parameter representing a position of the image capturing apparatus, and wherein the determination unit determines failure of the derivation of the position and orientation by comparing an amount of change in parameter representing a position measured by the sensor with a difference between positions of the image capturing apparatus derived by the position and orientation derivation unit.

* * * * *